(No Model.)
M. G. KELLOGG.
ELECTRIC CABLE.
No. 503,604. Patented Aug. 22, 1893.
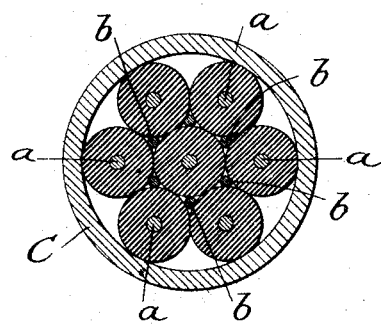
Attest:
Sidney P. Hollingsworth
R. Washington Miller.
Inventor.
MILO G. KELLOGG
by his attorneys
Baldwin, Davidson & Wight.

UNITED STATES PATENT OFFICE.

MILO G. KELLOGG, OF CHICAGO, ILLINOIS.

ELECTRIC CABLE.

SPECIFICATION forming part of Letters Patent No. 503,604, dated August 22, 1893.

Application filed November 15, 1890. Serial No. 371,517. (No model.)

*To all whom it may concern:*

Be it known that I, MILO G. KELLOGG, of Chicago, in the county of Cook and State of Illinois, have invented certain new and useful Improvements in Electric Cables, of which the following is a specification.

In some cases it is desirable to have a cable of electrical conductors that are to be used for different purposes, and it is not necessary that all of the conductors in the cable should be insulated in the same manner. For this reason, and also to economize space and thereby reduce the cross-section of the table to a minimum diameter, I adopt the construction hereinafter described and claimed.

The invention consists of a cable built up of individually insulated wires the insulations of which are in contact with each other as usual with other wires, either insulated or uninsulated, but preferably uninsulated occupying the angles or spaces existing between the individually insulated wires. The wires occupying such spaces may be relatively small, and only of a diameter sufficient to be accommodated in said spaces. They require no individually applied insulation, and therefore the spaces are fully utilized.

One use to which such a cable may be applied is described in my application, Serial No. 360,083, filed July 26, 1890, for a multiple switch board telephone exchange system. In that system, the individually insulated wires may be used for the circuits over which conversation is carried on, and the smaller wires occupying the spaces or angles between the individually insulated wires, may be used for calling purposes.

As is well known in telephony, it is desirable that the conductors forming the talking circuits, when insulated, should have the insulation applied concentrically around them, and that the insulation should be of uniform thickness, for the purpose of keeping the static capacity at a minimum. I therefore use the individually insulated wires for the talking circuits. The small wires occupying the spaces may be used for calling purposes, and no such care in their insulation is required, as the calling currents are generally of high potential. For the same reason, it is not necessary that the calling wires should be of comparatively low resistance, and they may, therefore, be of relatively small diameter.

The accompanying drawing is a cross-section of my improved cable.

The individually insulated telephone wires $a$, are laid up into a cable in any usual form or manner, with their insulations in contact as shown with the uninsulated calling wires $b$, occupying the spaces or angles formed between the insulations of the wires $a$. The calling wires are, therefore, properly insulated, and require no individual insulation, though of course they might be covered with insulation if desired.

C represents an exterior sheath which may be of lead, or any other suitable material, adapted to the purpose for which the cable is to be used, or to the place it will occupy when in use.

I claim as my invention—

1. The combination of the individually insulated wires laid up in cable form with their insulations in contact as usual and other wires occupying the angles or spaces between the insulations of the individually insulated wires.

2. The combination of the individually insulated wires laid up in cable form with their insulations in contact as usual and relatively small wires occupying the spaces or angles between the insulations of the other wires.

3. The combination of individually insulated wires, laid up in cable form with their insulations in contact as usual other wires occupying the spaces or angles between the insulations of the same, and an exterior envelope or sheath.

4. The combination of the individually insulated wires laid up in cable form with their insulations in contact as usual, and individually uninsulated wires occupying the spaces or angles between the insulations of the other wires.

5. The combination of the individually insulated wires laid up in cable form with their insulations in contact as usual, individually uninsulated wires occupying the spaces or angles between the insulations of the other wires, and an exterior envelope or sheath surrounding the assemblage of wires.

In testimony whereof I have hereunto subscribed my name.

MILO G. KELLOGG.

Witnesses:
CALVIN DE WOLF,
HENRY M. WALKER.